United States Patent [19]

Middelbeek et al.

[11] 4,138,342

[45] Feb. 6, 1979

[54] DEVICE FOR SEPARATING WATER FROM SUBSTANCES CONTAINED THEREIN

[75] Inventors: Cornelis G. Middelbeek, Nootdorp; Tjako A. Wolters, Zeist; Jan B. Den Boer, Zoetermeer, all of Netherlands

[73] Assignees: Ballast-Nedam Groep N.V., Amstelveen; Skimovex B.V., The Hague, both of Netherlands

[21] Appl. No.: 788,998

[22] Filed: Apr. 19, 1977

[30] Foreign Application Priority Data

Apr. 23, 1976 [NL] Netherlands .......................... 7604390

[51] Int. Cl.² ............................................ B01D 17/02
[52] U.S. Cl. ................................................... 210/522
[58] Field of Search ................. 210/84, 519, 521, 522

[56] References Cited

U.S. PATENT DOCUMENTS

| 2,307,154 | 1/1943 | Osuna | 210/522 X |
| 3,529,728 | 9/1970 | Middelbeek et al. | 210/522 |
| 3,914,175 | 10/1975 | Kunz et al. | 210/522 X |
| 4,028,256 | 6/1977 | Pielkenrood | 210/522 X |

*Primary Examiner*—William A. Cuchlinski, Jr.
*Attorney, Agent, or Firm*—Snyder, Brown & Ramik

[57] ABSTRACT

A device for separating water from light-weight and/or heavy substances contained therein. The separation takes place in a packet of parallel separation channels.

In order to prevent that too many light-weight substances enter the upper separation channels, the flow into the upper separation channels is throttled.

Also the lower separation channels may be throttled for restricting the heavy substances entering therein.

30 Claims, 12 Drawing Figures

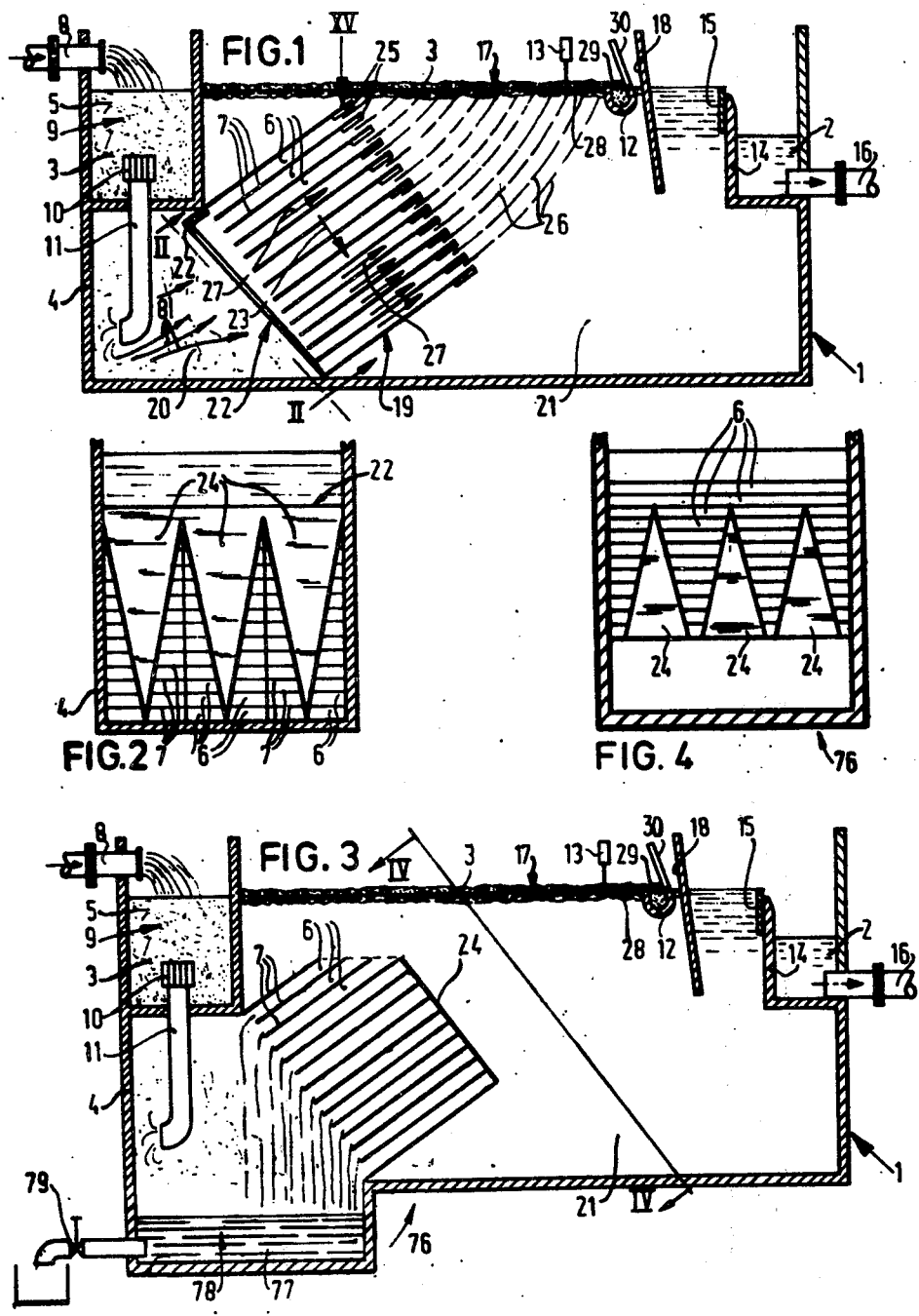

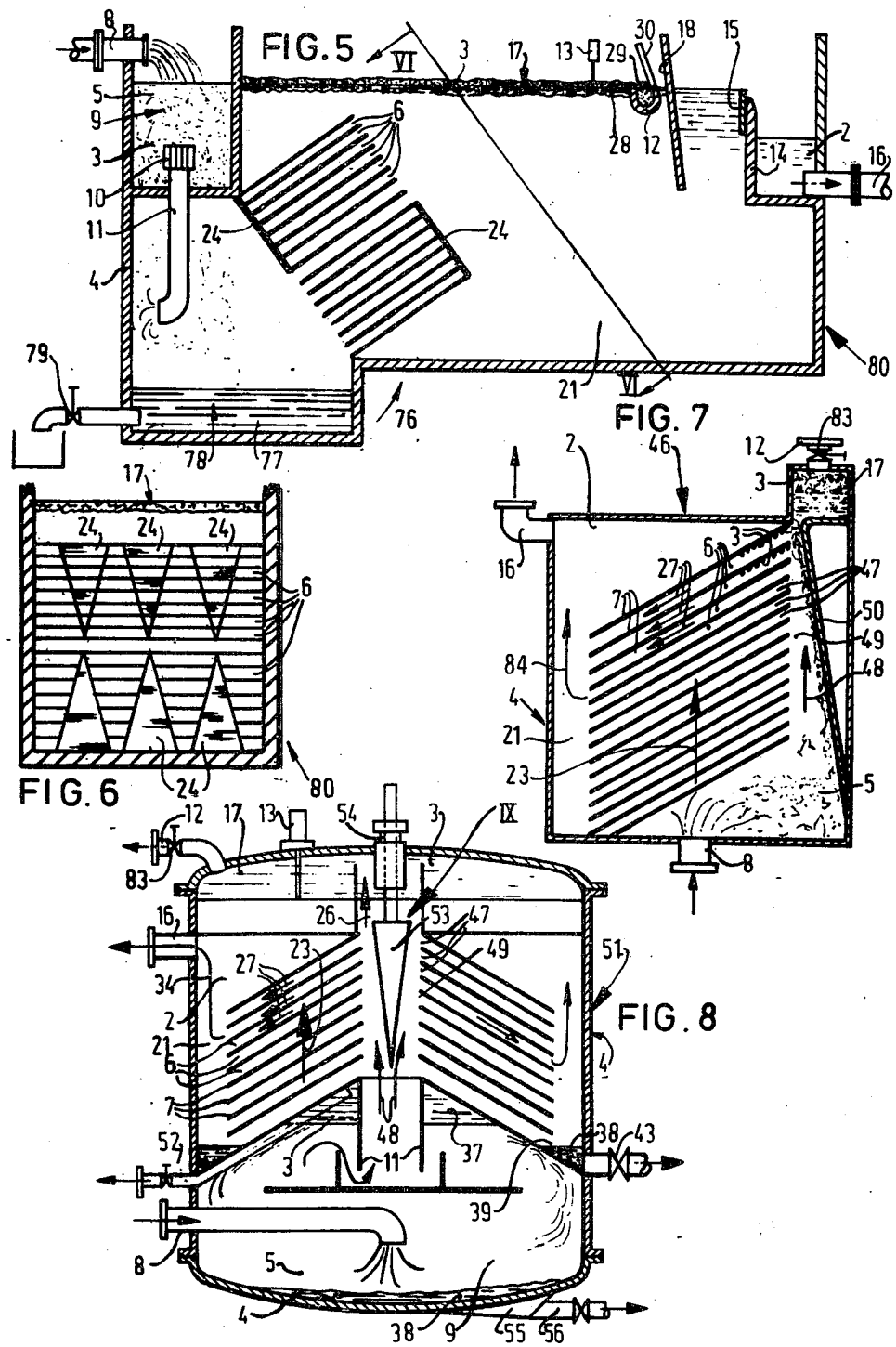

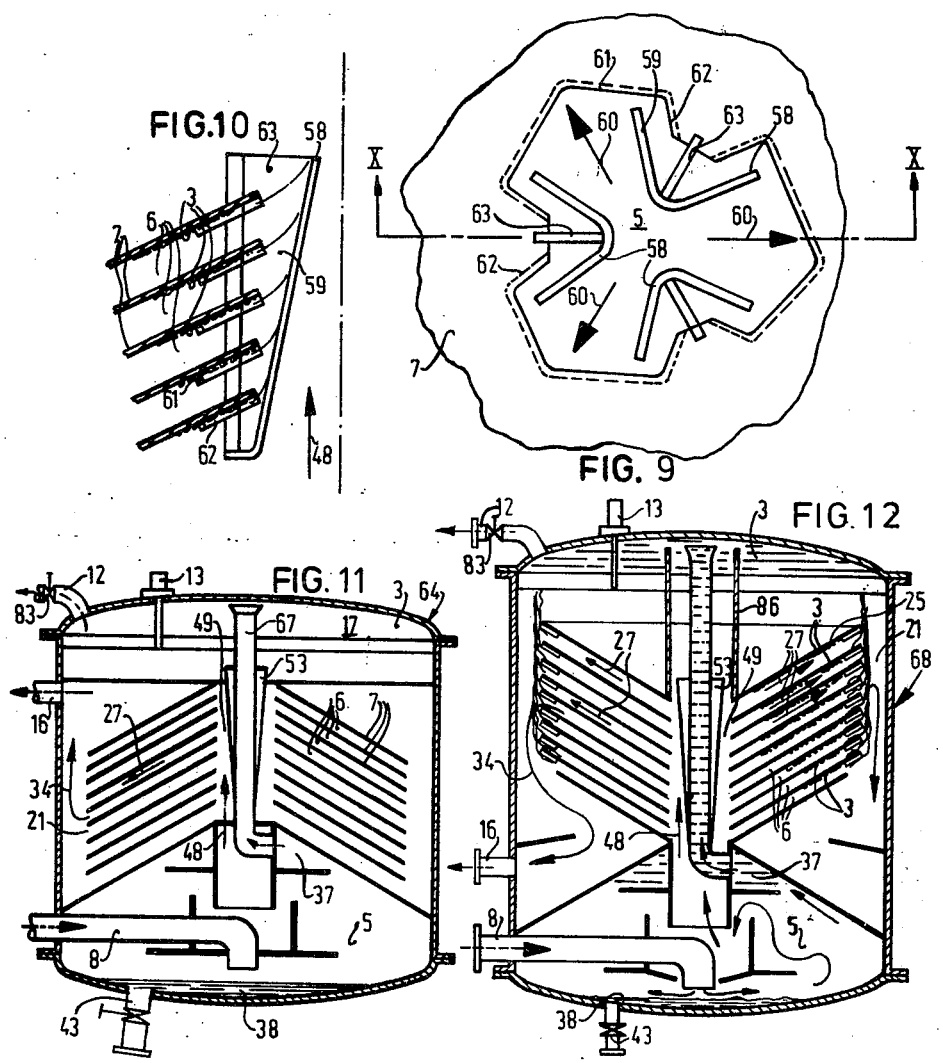

DEVICE FOR SEPARATING WATER FROM SUBSTANCES CONTAINED THEREIN

The invention relates to a device for separating water by means of gravity segregation from water insoluble substances contained therein, comprising a reservoir having a mixture supply, a water discharge and at least one discharge for separated substances which is separate from said water discharge, at least one flow path being established in the reservoir, in which a plurality of flat separation channels and a supply chamber and a discharge chamber communicating with said separation channels are arranged, said separation channels being vertically piled up in parallel relationship and bounded by channel walls.

Such a device is known. Herein the inlets of the separation channels piled above each other join a large supply chamber, so that the disadvantage occurs that the large particles of light substances may rise in the supply chamber and the large particles of heavy substances may descend in said chamber, as a result of which the upper separation channels have to work up proportionally too many light substances and the lower separation channels have to work up proportionally to many heavy substances.

The invention has for its object to divide the substances better over the separation channels.

To this aim the device in accordance with the invention is characterized in that for obtaining a uniform distribution of the substances over the separation channels displacer means are arranged which increasingly restrict the flow of liquid into the channels in the segregation direction. The displacer means are preferably constituted by a plurality of teeth divided over the width of the separation channels and mainly extending in the piling direction of the separation channels, the width of said teeth increasing in the segregation direction of the substances.

If the substances are lighter than water the tooth width will increase in an upward direction, whereas in the case of heavier substances the tooth width will increase in a downward direction. However, in case large particles of heavy substances as well as of light substances occur in the water, then teeth are preferably applied, whose width increase in both segregation directions.

In order to prevent that the flow of separated substances from the separation channels is hindered, the ends of the separation channels, at which many separated substances are delivered, are preferably ree from said teeth.

A further preferred embodiment of the device in accordance with the invention, which has a particular separation operation when separating water and light substances, is characterized in that a discharge for light substances is arranged separately from said water discharge, said discharge for light substances communicating with a collecting space for light substances which is arranged in the reservoir at a high level and in that the displacer means are constituted by a wall which narrows the supply chamber in the segregation direction of the light substances and which also constitutes a guide member for large particles of light substances which can be easily separated in the direction towards the collecting space for light substances.

The displacer means are preferably adjustable in the flow direction in the supply chamber.

A rather compact device is obtained when the separation channels are annular and incline upwardly from the supply chamber.

The invention will be described more fully hereinafter with reference to examples.

In the drawing there show schematically:

FIGS. 1, 3, 5, 7, 8, 11 and 12 each a longitudinal sectional view of a preferred embodiment of a device in accordance with the invention, FIG. 2 an elevational view taken on the line II-II in FIG. 1, FIG. 4 an elevational view taken on the line IV-IV in FIG. 3, FIG. 6 an elevational view taken on the line VI-VI in FIG. 5, FIG. 9 a plan view of a variant of detail IX of FIG. 8, and FIG. 10 a sectional view taken on the line X-X in FIG. 9.

The device 1 shown in FIGS. 1 and 2 for separating water 2 from water-insoluble, light-weight substances 3 contained therein, such as oil, comprises a reservoir 4 for receiving a mixture 5 of water 2 and substances 3 and a plurality of sloping separation channels 6 arranged in said reservoir, piled up in parallel relationship and bounded by separation walls 7, an inlet chamber 9, a mixture inlet 8 opening out in the inlet chamber 9, a tube 11 provided with a basket 10 and forming a communication between the inlet chamber 9 and the reservoir 4, a substance outlet 12, an interface sensor 13, an overflow 14 with an overflow rim 15, a water outlet 16 communicating with the overflow 14 and a screen 18 separating the overflow 14 from a space 17 for collecting the substances 3. The pile 19 of separation channels 6 is arranged between a feeding chamber 20 and a delivery chamber 21 of the reservoir 4. In this path a flow way according to arrows 27 and 81 is established in the reservoir 4, wherein the separation channels 6 and the feeding chamber 20 and the delivery chamber 21 communicating with said channels 6 are incorporated. Thus, that liquid which flows in said path is constrained to flow through said channels and is divided by the vertically spaced inlet mouths defined thereby so that each channel receives a portion of the liquid flow.

Large particles of light-weight substances 3 tend to rise in the feeding chamber 20 so that the risk would occur that the upper separation channels 6 receive too much light-weight substance. In order to prevent said risk and in order to divide the light-weight substances 3 more equally among the separation channels 6, the mixture 5 is guided to the separation channels 6 through a plurality of teeth 24 divided along the width of the separation channels 6, the width of said teeth increasing in the segregation direction of the light-weight substance, that is to say in the upward direction. These teeth 24 which converge equally according to FIG. 2, throttle the flow of mixture towards the upper separation channels 6 more than the flow of mixture towards the lower separation channels 6 so that the lower separation channels 6 receive a larger output of mixture having a smaller percentage of light-weight substance and thus nearly as much light-weight substance as the upper separation channels 6. The teeth 24 constitute a displacer a flow distributor means. The separation walls 7 comprise at their top ends gutter-shaped substance guide members 25.

Using the device 1 shown in FIG. 1 and 2 or anyone of the devices to be described hereinafter a mixture 5 of water 2 and substances 3 is passed in the direction of the arrow 27 through the plurality of separation channels 6 with such a low speed that by gravity the substances 3 are urged against the lower sides of the separation walls 7, along which they are moved in the direction of the arrow 27. The substances 3 are joined by the guide members 25 to narrow streams, which enter the delivery chamber 21, where they rise in the form of ascending drop streams 26 into the collecting space 17.

When the interface sensor 13 indicates that substances 3 are present at the level 28, the substance outlet 12 is turned about an axis 29, for example, by manually actuating a lever 30, for tapping the substances 3.

The purified water 2 flows through the overflow 14 towards the water outlet 16.

In the device 1 of FIG. 1 the teeth 24 are spaced apart at their top ends at a small distance from the separation channels 6. They form part of a comb 22.

On the contray the teeth 24 of the device 76 shown in FIGS. 3 and 4 are lying against the separation channels 6. Furthermore they are spaced apart from each other, do not reach to the complete height of the separation channels 6 and have a width increasing in downward direction, because the device 76 is used for operating upon water having a considerable amount of heavy substances 77 which readily descend and settle into a collecting space 78 from which they are tapped through a closing member 79.

Just as the separation channels 6 of FIGS. 1 and 2 the separation channels 6 of FIGS. 3 and 4 are free from the teeth 24 at those ends at which many separated substances are delivered. As a result the teeth 24 considerably throttle the inflow in the upper separation channels 5 in FIGS. 1 and 2; whereas the teeth 24 of FIGS. 3 and 4 considerably throttle the outflow from the lower separation channels 6.

The device 80 shown in FIG. 5 differs from that shown in FIG. 4 only in that the teeth 24 for throttling the mixture having many heavy substances 77 are shorter and in that at the top side also teeth 24 for throttling the mixture having many light-weight substances 3 are arranged.

The device 46 shown in FIG. 7 comprises a reservoir 4 having a mixture inlet 8 on the bottom side and separation channels 6 whose inlets 47 are arranged in superposition and communicate with a standing feeding chamber 49 converging in the direction of flow 48 in order to ensure that the separation channels 6 all receive equal quantities of substances 3. The readily separated substances 3, for example, light oil, arrives at the inclined wall 50 and flows therealong into the collecting space 17, which is arranged at a high level in the reservoir 4. The inclined wall 50 forms displacer or flow distributor means distributing a mixture 5 among the separation channels 6 in the vertical direction 23, in that the inlet to the flow path through the channels from the feeding chamber 49 is increasingly restricted by the wall 50 in upward direction, that is to say in the segregation direction. Furthermore substances 3 flow in a counter-flow along the separation walls 7 with respect to the direction of flow path 27 of the mixture 5, into the collecting space 17. The device 46 comprises furthermore a water outlet 16 and a separate substance outlet 12 having a controllable closing member 83. The flow path in the reservoir 4 runs from the mixture inlet 8 according to arrow 48 through the feeding chamber 49 and then in separate parallel paths according to arrows 27 through the separation channels 6 and then vertically according to arrow 84 through the delivery chamber 21 towards the water outlet 16.

The device 51 shown in FIG. 8 comprises in the reservoir 4 a plurality of annular separation channels 6 with separation walls 7 each having the shape of a truncated cone. The mixture 5 enters via a mixture inlet 8 the inlet chamber 9, in which the readily separable substances 3 rise into a collecting space 37, the substances being removed through a delivery port 52 having a closing member 85. The mixture 5 flows through a tube 11 in the direction of flow 48 from a central feeding chamber 49, in which a displacer 53 converging opposite the direction of flow 48 is adjustably disposed by means of screws 54 in order to adapt the distribution of the substances 3 in the mixture 5 among the separation channels 6 to the operation conditions, whilst a standard packet of separation walls 7 is maintained. The purified water 2 emerges from a water outlet 16 and the light substances 3 collected in the space 17 are removed via the substance outlet 12 comprising the closing member 83.

The heavy substances 38 collected in the spaces 39 and 55 are removed through outlets 43 and 56.

A variant of the device 51 comprises, instead of an adjustable, central displacer 53, a plurality of gutter-shaped displacers 58 shown in FIGS. 9 and 10, each forming a guide for substances 3 delivered by separation channels 6 and thus passed to the collecting space 17. The displacers 58 distribute the mixture 5 evenly among the separation channels 6 and screen the separated substances 3 from the mixture 5 flowing out in the direction of the arrows 60.

The separation walls 7 have substance guide members in the form of inner rims 61 joining finger-shaped substance guide members 62, which are fastened by strips 63 to the gutter-shaped displacers 58.

The device 64 shown in FIG. 11 is distinguished from device 51 in that the displacer 53 is arranged around a communicating tube 67 between the collecting spaces 37 and 17.

The device 68 shown in FIG. 12 differs from device 64 in that the separation channels 6 are inclined away from the central feeding chamber 49 in an upward and outward direction and in that substance guide members 25 are arranged on the outer walls of the separation walls 7. The mixture 5 and the substances 3 then flow in the same direction 27 through the separation channels 6. Large particles of light substance 3 may rise along the displacer 53 and through a tube 86 reaching into the collecting space 17, whereas the mixture is urged through the separation channels 6 towards the delivery chamber 21.

What we claim is:

1. A device for separating at least one water-insoluble substance from a flowing mixture of water and such substance, said substance having a specific gravity different from that of the water, comprising in combination:
    a reservoir for receiving said mixture and having an outlet from which purified water from said mixture is withdrawn;
    inlet means for introducing said mixture into said reservoir so that a liquid flow path is maintained within said reservoir from said inlet means to said outlet;
    a separation unit within said reservoir between said inlet means and said outlet whereby all of the liquid flowing in said path is constrained to pass through said separation unit, said separation unit comprising a series of vertically spaced walls defining a vertically stacked series of separate separation channels, said channels presenting at one end of said separation unit a vertically extending series of inlet mouths for said liquid flowing in said path whereby said substance tends to be unevenly distributed to such mouths, and said channels discharging such liquid from the opposite end of said separation unit, said channels being inclined with respect to the horizontal to allow separation of said water and said substance therewithin whereby, at one of the ends of said separation unit, said substance escapes in a generally vertical direction away from said flow path;

means for collecting and removing the escaping substance; and flow distributor means associated with said channels for causing the liquid of said flow path to be unequally distributed within said channels whereby at least some of said channels each receive substantially the same amount of said substance.

2. A device as claimed in claim 1, wherein the flow distributor means comprises a plurality of vertically extending teeth divided over the width of the separation channels the width of said teeth increasing in the segregation direction of the substance.

3. A device as claimed in claim 2, characterized in that the ends of the separation channels, at which many separated substances are delivered, are free from said teeth.

4. A device as defined in claim 1 wherein said substance is lighter than the water and said flow distributing means restricts flow to said inlet mouths increasingly in the vertically upward direction.

5. A device as defined in claim 1 wherein the water contains one substance which is lighter than the water and another substance which is heavier than the water, said flow distributor means including one portion which increasingly restricts the liquid flow to some of said inlet mouths in the upward direction and another portion which increasingly restricts the liquid flow to other of said inlet mouths in the downward direction.

6. A device as defined in claim 1 including means for vertically adjusting said flow distributor means.

7. A device as defined in claim 1 wherein said plates are of frusto-conical form.

8. A device as defined in claim 7 wherein said flow distributor means comprises a member defining a wall which is spaced from said inlet mouths and is disposed increasingly closer thereto in the upward direction, said substance being lighter than the water and said reservoir including a collection space for said substance vertically above said member, said member being of inverted conical shape and being disposed centrally of said plates.

9. A device as defined in claim 8 including means for vertically adjusting said member.

10. A device as defined in claim 8 wherein said frusto-conical plates are disposed to define inwardly and upwardly inclined channels.

11. A device as defined in claim 10 including means for vertically adjusting said member.

12. A device as defined in claim 8 wherein said frusto-conical plates are disposed to define inwardly and downwardly inclined channels.

13. A device as defined in claim 12 including means for vertically adjusting said member.

14. A device as defined in claim 1 wherein said flow distributor means comprises a member defining a wall which is spaced from said inlet mouths and is disposed increasingly closer thereto in the upward direction, said substance being lighter than the water and said reservoir including a collection space for said substance vertically above said member.

15. A device as defined in claim 1 wherein certain of said inlet mouths are unaffected by said flow distributor means.

16. A device for separating at least one water insoluble substance from flowing water having such substance entrained therein, such substance having a specific gravity less than the water, comprising in combination:

a reservoir having a purified water outlet in an upper region thereof and means for introducing a stream of said water with the substance entrained therein into a lower region of said reservoir whereby to create a water flow path in said reservoir from said inlet means to said outlet;

a separation unit between said inlet means and said outlet dividing the interior of said reservoir into a feeding chamber receiving said stream of water with entrained substance and a delivery chamber leading to said outlet, said separation unit establishing a generally horizontally extending water flow path therethrough and comprising a series of vertically spaced plates defining a multiplicity of separation channels presenting vertically spaced inlet mouths in said feeding chamber whereby the inherent upward migration of the lighter substance within said feeding chamber tends to cause an uneven distribution of said substance to said inlet mouths which increases upwardly, said channels at their opposite ends directing the flowing water to said delivery chamber, and said plates being inclined with respect to the horizontal whereby the lighter substance entering each channel tends to collect in the upper part thereof and issue from one end of its channel in a generally upwardly trajectory away from said generally horizontally extending water flow path;

means in the upper part of said reservoir for collecting said substance so issuing and discharging same from the reservoir; and flow distributor means within said feeding chamber for throttling the flow of water into said inlet mouths increasingly in the upward direction whereby to offset said uneven distribution of said substance.

17. A device as defined in claim 16 wherein said plates incline upwardly from said inlet mouths whereby the substance issues from said opposite ends of said channels.

18. A device as defined in claim 16 wherein said plates incline downwardly from said inlet mouths whereby the substance issues from said inlet mouths.

19. A device as defined in claim 16 wherein said flow distributor means comprises a member presenting a wall which is spaced from said inlet mouths but extends in upwardly convergent relation therewith.

20. A device as defined in claim 19 wherein said plates are of frusto-conical form and said member extends centrally of said plates and is of inverted conical shape.

21. A device as defined in claim 20 wherein said plates incline upwardly from said inlet mouths whereby the substance issues from said opposite ends of said channels.

22. A device as defined in claim 20 wherein said plates incline downwardly from said inlet mouths whereby the substance issues from said inlet mouths.

23. A device as defined in claim 20 wherein said reservoir is vertically elongate and said feeding chamber is in the bottom thereof, said conical plates being disposed in an intermediate region of the reservoir and said outlet being disposed immediately above said opposite ends of the channels, said opposite ends of the channels being spaced inwardly from the walls of said reservoir whereby said delivery chamber surrounds the separation unit, said reservoir including a partition below said separation unit having a central opening leading to the central openings of said plates, and a tube depending from said central opening of the partition toward said inlet means.

24. A device as defined in claim 23 including a central passage through said member communicating with the space beneath said partition through the side of said tube.

25. A device as defined in claim 24 wherein said plates incline upwardly from said inlet mouths whereby the substance issues from said opposite ends of said channels.

26. A device as defined in claim 24 wherein said plates incline downwardly from said inlet mouths whereby the substance issues from said inlet mouths.

27. A device as defined in claim 24 wherein said plates incline downwardly from said inlet mouths whereby the substance issues from said inlet mouths.

28. A device as defined in claim 27 including means for vertically adjusting said flow distributor means.

29. A device as defined in claim 23 wherein said plates incline upwardly from said inlet mouths whereby the substance issues from said opposite ends of said channels.

30. A device as defined in claim 29 including means for vertically adjusting said flow distributor means.

* * * * *